United States Patent [19]

Holub et al.

[11] 4,331,799

[45] May 25, 1982

[54] COPOLYMERS OF ETHERIMIDES AND AMIDEIMIDES

[75] Inventors: Fred F. Holub, Schenectady, N.Y.; Gary A. Mellinger, Louisville, Ky.

[73] Assignee: General Electric Company, Schenectady, N.Y.

[21] Appl. No.: 239,754

[22] Filed: Mar. 2, 1981

Related U.S. Application Data

[63] Continuation of Ser. No. 110,894, Jan. 10, 1980, abandoned.

[51] Int. Cl.³ ............................................. C08G 73/14
[52] U.S. Cl. .................................... 528/185; 428/435; 528/26; 528/187; 528/188; 528/189; 528/342; 528/350; 528/353
[58] Field of Search .................. 528/185, 187, 342, 26, 528/188, 189, 350, 353

[56] References Cited

U.S. PATENT DOCUMENTS

| | | | |
|---|---|---|---|
| 3,847,867 | 11/1974 | Heath et al. | 528/185 |
| 3,905,942 | 9/1975 | Takekoshi et al. | 528/179 |
| 3,972,902 | 8/1976 | Heath et al. | 528/97 X |
| 4,197,396 | 4/1980 | Banucci et al. | 528/185 X |
| 4,215,157 | 7/1980 | Boldebuck et al. | 528/185 X |

FOREIGN PATENT DOCUMENTS

917844 12/1972 Canada ................................ 528/185

OTHER PUBLICATIONS

Lee et al., *New Linear Polymers*, McGraw-Hill, Nov. 14, 1967, pp. 179–185.

*Primary Examiner*—Howard E. Schain
*Attorney, Agent, or Firm*—Joseph T. Cohen; James C. Davis, Jr.

[57] ABSTRACT

Copolymers of etherimides and amideimides have been found to be useful in the coating and molding arts.

29 Claims, No Drawings

COPOLYMERS OF ETHERIMIDES AND AMIDEIMIDES

This application is a continuation of application Ser. No. 110,894, filed Jan. 10, 1980, now abandoned.

This invention is concerned with copolymers containing amideimide (AI) units and etherimide (EI) units useful in the coating and molding arts. More particularly the invention is concerned with a copolymer comprising (1) from 5 to 95 mol percent of AI chemically combined combined units of the formula

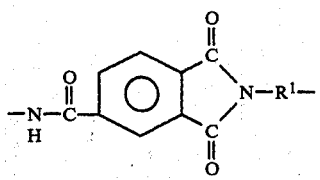
I.

and (2) from 95 to 5 mol percent of EI chemically combined units of the formula

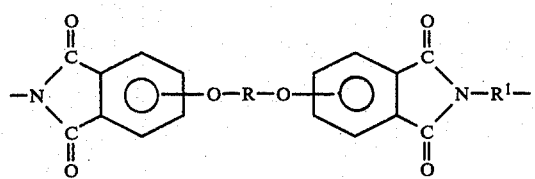
II.

where R is a member selected from the class consisting of
(a) the following divalent organic radicals:

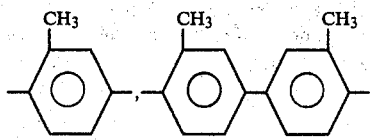

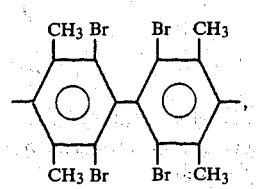

and (b) divalent organic radicals of the general formula:

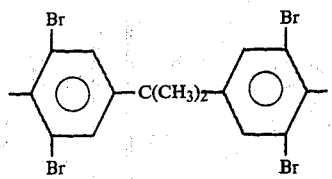

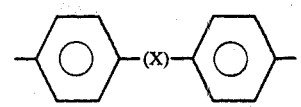

where X is $-C_yH_{2y}-$, y is a whole number equal to from 1 to 5 inclusive, and $R^1$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, (c) $C_{(2-8)}$ alkylene terminated polydiorganosiloxanes, and (d) divalent radicals included by the formula,

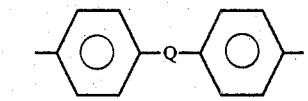

where Q is a member selected from the class consisting of

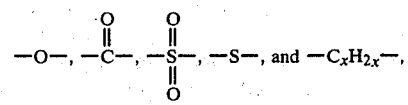

and x is a whole number equal to from 1 to 5, inclusive.

The combined random units can be considered as having the general formula

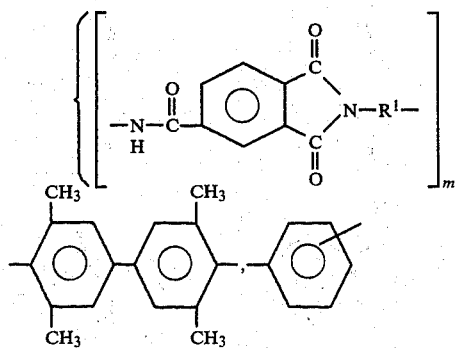

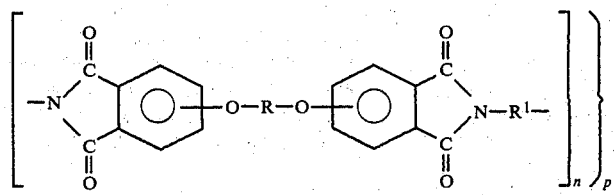

where R and $R^1$ have the meanings above, m and n are whole numbers independently equal to at least 1, e.g., 5 to 5000 or more, and p is a whole number greater than 1, e.g., from 5 to 10,000 or more and advantageously from 10 to 1000.

Prior to imidization, the copolymers are in the amide state as exemplified by the following general formula:

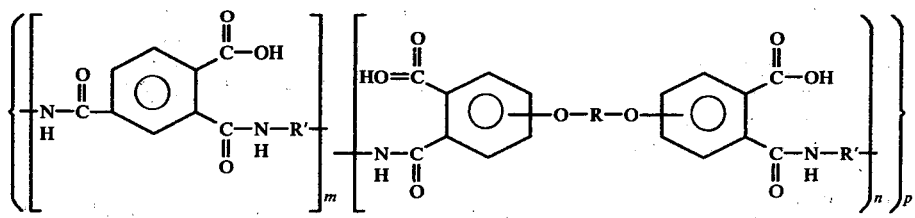

and specifically of the general formula:

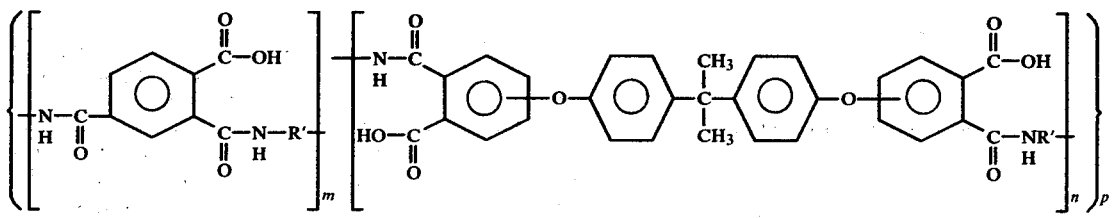

where R, R', m, n, and p have the meanings above.

Polyamideimides are known to have good chemical resistance and moderate heat resistance. Although such polyamideimides can be dissolved in suitable solvents for coating applications such polyamideimides are quite difficult to mold and require excessive temperatures and pressures in the molding cycle. Polyetherimides are known to have good high temperature characteristics and are more amenable to viable molding cycles; however, it would be advantageous to upgrade the chemical resistance of these polyetherimides and reduce their cost for molding and coating applications.

We have unexpectedly discovered that copolymers containing chemically combined units of formulas I and II over a wide range of molar concentration, can be made in which the properties of the copolymer show modified properties over the properties of homopolymers of these units. In some instances, the improvement in properties are unexpected considering the proportion of either the AI unit or the EI unit present in the copolymer. By making the above-described copolymers, the utility of the latter can be considerably expanded. In addition, by combining these two units in the copolymer, products can be obtained which are lower in cost than is usually associated with the manufacture of polyetherimides alone, without significant sacrifice (if any) in physical properties.

A preferred class of copolymers which are included by formula III are copolymers consisting essentially of from about 2 to 5000 or more units and preferably from 5 to 100 units of EI units of the formula

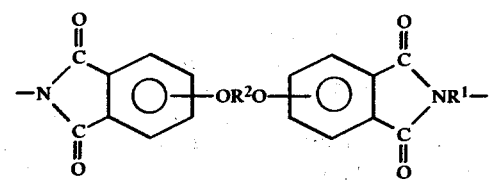

IV.

where $R^1$ is previously defined, and $R^2$ is

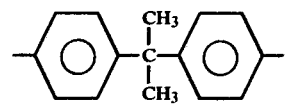

Included in the etherimide units of formula IV as part of the copolymer molecules are the following chemically combined units,

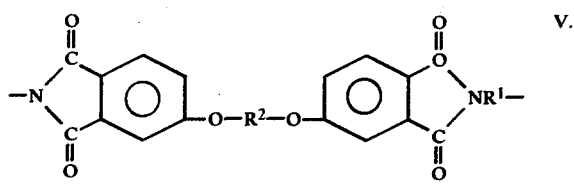

V.

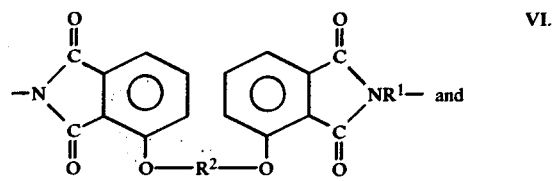

VI.

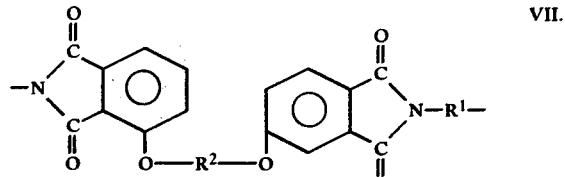

VII.

and mixtures thereof, where $R^1$ and $R^2$ are defined above.

The copolymers of formula III can be made by effecting reaction between an aromatic bis(etheranhydride) of the general formula,

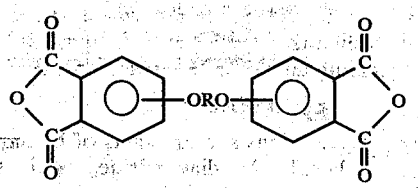

a trimellitic acid chloride (TMAC) of the formula

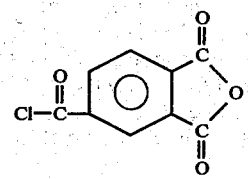

and an organic diamine of the general formula, $$H_2NR^1NH_2 \qquad\qquad X.$$

where R and $R^1$ are as previously defined.

There can be employed from 0.95 to 1.05 total mols of the anhydrides of formulas VIII and IX per mol of organic diamine of formula X. It is preferred to employ substantially equal molar amounts of (a) the anhydrides of formulas VIII and IX and (b) the organic diamine. The copolymers employed in the present invention can be those where there are from 10 to 5000 or more units of either formulas I and II and p in formula III is 5 or more, e.g., from 10 to 1000.

The acyl halide derivative of formula IX derived from trimellitic anhydride (1,3,4-benzene tricarboxylic acid anhydride) can have at least one acyl halide and that in the 4-ring position, and includes derivatives, such as the 4-acid chloride 1,4- and 2,4-diacid chloride. The bromide and other reactive halide derivatives are also suitable.

Chain stoppers such as aniline or mono-organic acid derivatives or monoanhydrides may be used in making the copolymers.

Generally the copolymers of the present invention can be obtained by effecting reaction between the chosen organic diamine and the particular dianhydride and monoanhydride, of formulas VIII and IX, respectively, in the presence of a dipolar aprotic organic solvent under ambient conditions to produce a copolymeric amide acid. Upon further heating, the amide acid converts to the imidized state with the copolymer comprising the units of formulas I and II in a random distribution. Depending upon the solids content of the polyamide acid solution, reaction can be completed in from 0.5 to 2 hours or more. Upon completion of the reaction, the solution can be cast on a substrate so that evaporation of the organic solvent occurs. By heating at temperatures of from 150°–200° C. or higher one converts the copolymeric polyamide acid to the polyimide state, so that the copolymer at this point has good heat resistance, chemical resistance such as solvent resistance, and moldability. Such compositions are particularly useful as wire coating enamels and impart solvent resistance and heat resistance properties to various substrates.

The aromatic bis(etheranhydride) of formula VII can be prepared from the hydrolysis followed by dehydration of the reaction product of the nitrosubstituted phenyl dinitrile and then reaction with a dialkali metal salt of a dihydric aryl compound in the presence of a dipolar aprotic solvent, where the alkali metal salt has the general formula $$Alk-O-R^1-O-Alk$$

where $R^1$ has the meanings given above and preferably is the same as $R^2$ and Alk is an alkali metal ion. Various well known procedures can be used to convert the resulting tetranitriles to the corresponding tetracids and dianhydrides.

Included among the alkali metal salts of the above described dihydric phenols are sodium and potassium salts of the following dihydric phenols:
2,2-bis(hydroxyphenyl)propane;
2,4'-dihydroxydiphenylmethane
bis-(2-hydroxyphenyl)-methane;
2,2-bis-(4-hydroxyphenyl)-propane hereinafter idenas "bisphenol-A" or "BPA;"
1,1-bis-(4-hydroxyphenyl)-ethane;
1,1-bis-(4-hydroxyphenyl)-propane
3,3-bis-(4-hydroxyphenyl)-pentane;
4,4'-dihydroxybiphenyl;
4,4'-dihydroxy-3,3',5,5'-tetramethylbiphenyl;
2,4-dihydroxybenzophenone;
4,4-dihydroxydiphenyl sulfone;
2,4'-dihydroxydiphenyl sulfone;
4,4'-dihydroxydiphenyl sulfoxide;
4,4'-dihydroxydiphenyl sulfide; etc.

Included by the organic diamines of formula X are, for example,
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminoaphthalene;
3,3'-dimethylbenzidine;
3,3'-dimethoxybenzidine;
2,4-diaminotoluene; 2,6-diaminotoluene;
2,4-bis (β-amino-t-butyl)toluene;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
3-methylheptamethylenediamine;
5-methylnonamethylenediamine;
1,4-cyclohexanediamine;
1.12-octadecanediamine;
bis(3-aminopropyl)sulfide;
N-methyl-bis(3-aminopropyl)amine;
hexamethylenediamine;
nonamethylenediamine; 2,6-diaminotoluene;
bis-(3-aminopropyl)tetramethyldisiloxane, etc.

The copolymeric composition can be reinforced with various particulated fillers such as glass fibers, silica, fillers, carbon whiskers, up to 50% or more, by weight, of the copolymer.

In order that those skilled in the art may better understand how the present invention may be practiced, the following examples are given by way of illustration and not by way of limitation. All parts are by weight unless otherwise indicated.

EXAMPLE 1

A copolymer containing AI units and EI was prepared by effecting reaction of 2 grams 4,4'-methylenedianiline, 1.56 grams of 4,4'-BPA-dianhydride and 1.47 grams of 4-chloroformyl phthalic anhydride in 15 cc of N-methylpyrrolidone. The mixture was stirred at room temperature until it became clear with the mixture exotherming to 40° C. Upon cooling, the copolymer composition was cast as a film on glass at a temperature of about 150°–280° C. to imidize the amic acid groups. This polymer which had a molar ratio of 30 mol percent of EI units and 70 mol percent of AI units softened at about 300° C.

EXAMPLE 2

This example illustrates the preparation of a homopolyetherimide which will be compared further on with a copolymeric composition containing the same diamino organic compound. Means for making such homo polyetherimides are described in U.S. Pat. No. 3,847,867 issued Nov. 12, 1974, and assigned to the same assignee as the present invention. 5.2 grams (0.01 mol) 2,2-bis[4-(2-dicarboxyphenoxy)phenyl] propane dianhydride (hereinafter referred to as "BPA dianhydride") and 1.08 grams (0.01 mol) m-phenylenediamine were dissolved in 30 cc N-methylpyrrolidone. Upon stirring the mixture exothermed at 42° C. to give a clear homopolymeric amic acid solution. A film was cast from this solution at 280°–300° C. yielding an imidized polymeric film.

EXAMPLE 3

This example illustrates the preparation of a homopolymeric amideimide. More particularly, 2.1 grams (0.01 mol) trimellitic acid chloride (TMAC formula IX) and 1.08 grams (0.01 mol) m-phenylenediamine were dissolved in 30 cc N-methylpyrrolidone. The mixture was stirred during which time the solution exothermed to about 43° C. to give a clear polymeric amic acid amide.

A portion of this solution was cast at 280°–300° C. in a flat surface to yield an imidized homopolymeric AI film.

EXAMPLE 4

A copolymer was prepared by mixing together 1.89 grams (0.009 mol) TMAC, 0.52 grams (0.001 mol) BPA dianhydride and 1.08 grams (0.01 mol) of m-phenylenediamine dissolved in 30 cc N-methylpyrrolidone. After stirring at room temperature the mixture exothermed to about 47° C., at which point a clear polymeric amide acid amide solution was obtained. A film was cast from this solution at a temperature of 280°–300° C. yielding an imidized copolymeric film.

EXAMPLE 5

Employing the conditions and reactants of Example 4, TMAC, bisphenol A dianhydride, and m-phenylenediamine were interacted in the same manner to form copolymeric compositions which when cast as films at elevated temperatures of 280°–300° C. yielded imidized copolymer films having good resistance to abrasion. The following Table I shows the proportions of the various ingredients and the temperature, at which the solutions of the three reactants exothermed after stirring, In each instance, 30 cc N-methylpyrrolidone was used in making the initial solution of the three reactants.

TABLE I

| | TMAC | | BPA Dianhydride | | m-phenylene diamine | | Exotherm Temp. |
|---|---|---|---|---|---|---|---|
| | Wt. gms. | Mols | Wt. gms. | Mols | Wt. gms. | Mols | |
| Ex. 4 | 1.89 | 0.009 | 0.52 | 0.001 | 1.08 | 0.01 | 47° C. |
| 5A | 1.68 | 0.008 | 1.04 | 0.002 | 1.08 | 0.01 | 48° C. |
| 5B | 1.26 | 0.006 | 2.08 | 0.004 | 1.08 | 0.01 | 46° C. |
| 5C | 0.84 | 0.004 | 3.12 | 0.006 | 1.08 | 0.01 | 44° C. |
| 5D | 0.42 | 0.002 | 4.16 | 0.008 | 1.08 | 0.01 | 43° C. |
| 5E | 0.21 | 0.001 | 4.68 | 0.009 | 1.08 | 0.01 | 44° C. |
| *5F | 1.05 | 0.005 | 2.6 | 0.005 | 1.08 | 0.01 | 41° C. |

*Used 15 cc N-methyl pyrrolidone

The Tg's (which measures the degree of softening of the polymers) of all of the copolymers of Examples 4 and 5A to 5F were determined with the results shown in Table II.

TABLE II

| Test No. | Tg °C. |
|---|---|
| 5A | — |
| 5B | 223 |
| 5C | 221 |
| 5D | 204 |
| 5E | 212 |
| 5F | 209 |
| Example 2 | 193 |
| Example 3 | 241 |
| Example 4 | 222 |

The copolymers obtained in Examples 4, and 5A to 5F can be represented by the formula

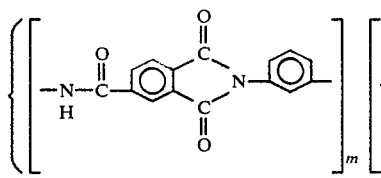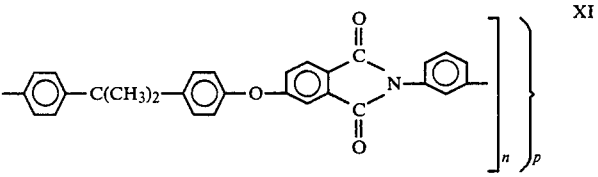

where the units are in random arrangement, m and n are whole numbers greater than 1 and conform essentially to the molar concentrations of the reactants originally used, and p is a whole number greater than 1.

EXAMPLE 6

Employing the same conditions as used in Example 4, 2.1 grams (0.01 mol) TMAC and 2.48 grams (0.01 mol) 4,4'-diphenyldiaminosulfone having the formula

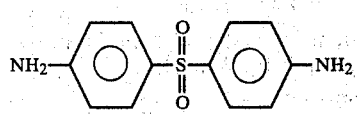

XII were dissolved with stirring in 15 cc N-methylpyrrolidone; the mixture exothermed at 37° C. The clear polymeric amic acid amide solution which was obtained was cast at 280°–300° C. to yield an imidized homopolymeric film.

EXAMPLE 7

Employing the conditions recited in Example 4, 5.2 grams (0.01 mol) BPA dianhydride and 2.48 grams (0.01 mol) of the sulfone of formula XII used in Example 1 were dissolved in 15 cc N-methylpyrrolidone, which after stirring exothermed to 38° C., yielding a clear homopolymeric amic acid solution. A film cast from this solution at 280°–300° C. yielded an imidized homopolymeric film.

EXAMPLE 8

In this example copolymers were made from TMAC, BPA dianhydride and the sulfone of formula XII by dissolving the reactants in 15 cc N-methylpyrrolidone and effecting stirring of the mixture until a clear polymeric amic acid amide was obtained. In each instance, films were cast at 280°–300° C. to yield imidized copolymeric films having good resistance to abrasion. The following Table III shows the weight and molar concentrations of the ingredients, the exotherm temperatures, and the glass transition temperature (Tg's) for each of the compositions described in Examples 6–8.

TABLE III

| Test No. | TMAC Wt. gms. | Mols | BPA Dianhydride Wt. gms. | Mols | *Sulfone Wt. gms. | Mols | Exotherm Temp. °C. | Tg °C. |
|---|---|---|---|---|---|---|---|---|
| Ex. 6 | | | | | | | 37 | 220 |
| Ex. 7 | | | | | | | 37 | 220 |
| 8A | 1.05 | 0.005 | 2.6 | 0.005 | 2.48 | 0.01 | 41 | — |
| 8B | 0.42 | 0.002 | 4.16 | 0.008 | 2.48 | 0.01 | 39 | 181 |
| 8C | 1.68 | 0.008 | 1.04 | 0.002 | 2.48 | 0.01 | 37 | 208 |

*4,4'-diaminodiphenyl sulfone

The imidized copolymers in Example 8 can be illustrated by the following formula The following examples illustrate the preparation of homopolymers from either a dianhydride with 4,4'-oxydianiline of the formula

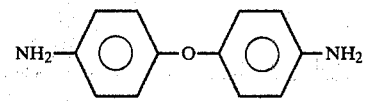

XIV.

of from TMAC and the same oxydianiline, as well as copolymers made from the mixture of the oxydianiline, the BPA dianhydride, and the TMAC.

EXAMPLE 9

5.2 grams (0.01 mol) BPA dianhydride and 2 grams (0.01 mol) 4,4'-oxydianiline were dissolved in 15 cc N-methylpyrrolidone and stirred to yield after the mixture exothermed to 51° C., a clear polymeric amic acid solution. A film was cast from this solution at 280°–300° C. to yield an imidized homopolymeric film.

EXAMPLE 10

2.1 grams (0.01 mol) TMAC and 2.0 grams (0.01 mol) 4,4'-oxydianiline were dissolved 15 cc N-methylpyrrolidone and the mixture stirred vigorously after which it exothermed to 53° C. The clear homopolymeric amic acid amide solution which was obtained was cast at 280°–300° C. to yield an imidized homopolymeric film.

EXAMPLE 11

In this example TMAC, BPA dianhydride and 4,4'-oxydianiline were copolymerized similarly as is done in Example 4 by dissolving the reactants in 15 cc N-methylpyrrolidone and thereafter casting the polymeric amic acid amide solution into a film at 280°–300° C. to yield an imidized copolymeric film. The following Table IV shows the weight and molar concentrations of the reactants and the exotherm temperature of each mixture as the result of stirring the reactants.

TABLE IV

| Test No. | TMAC Wt. gms. | Mols | BPA Dianhydride Wt. gms. | Mols | 4,4'-Oxydianiline Wt. gms. | Mols | Temp. Exotherm |
|---|---|---|---|---|---|---|---|
| 11A | 1.05 | 0.005 | 2.6 | 0.005 | 1.98 | 0.01 | 41° C. |
| 11B | 1.68 | 0.008 | 1.04 | 0.002 | 2.0 | 0.01 | 50° C. |

The Tg's of the homopolymers and copolymers prepared in Examples 9, 10, 11A, and 11B were determined

XIII.

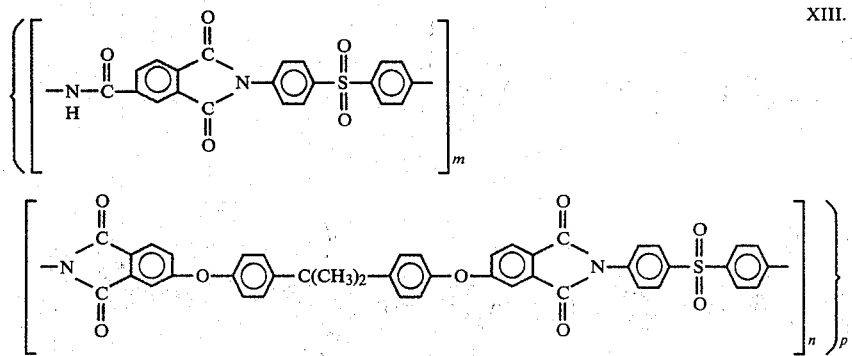

where m, n, and p have the meanings above.

with the results shown in Table V.

TABLE V

| Test No. | Tg |
|---|---|
| Ex. 9 | 213° C. |
| Ex. 10 | 230° C. |
| 11A | 205° C. |
| 11B | 206° C. |

The copolymers obtained in test 11A and 11B can be considered as having random units associated in the manner described in the following formula

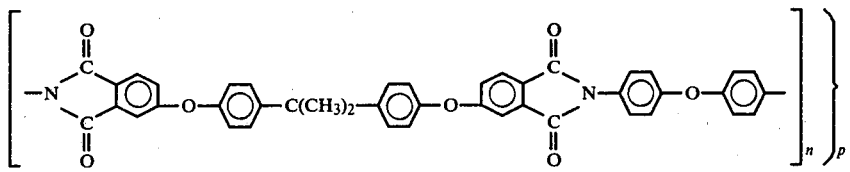

where m and n are values corresponding to the molar concentration of the reactants used, and p is a whole number greater than one.

The following examples illustrate the preparation and properties of homopolymers and copolymers made using 4,4'-methylenedianiline having the formula

XVI.

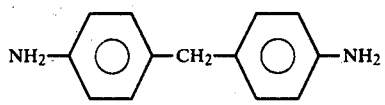

as the organic diamine.

EXAMPLE 12

2.1 grams (0.01 mol) TMAC and 1.98 grams (0.01 mol) 4,4'-methylenedianiline were dissolved in 15 cc N-methylpyrrolidone and stirred until the mixture exothermed at 54° C. The clear homopolymeric acid amide solution obtained was cast at 280°-300° C. to yield an imidized homopolymeric film.

EXAMPLE 13

5.2 grams (0.01 mol) BPA dianhydride and 1.98 grams (0.01 mol) 4,4'-methylenedianiline were dissolved with stirring in 15 cc N-methylpyrrolidone thereby causing the temperature of the mixture to exotherm to 49° C. The clear homopolymeric amic acid solution which resulted was cast as a film at 280°-300° C. to form a homopolymeric imidized film.

XV.

EXAMPLE 14

In this example, employing the same conditions as in Example 4, TMAC, BPA dianhydride, and 4,4'-methylenedianiline were mixed together and dissolved in 15 cc N-methylpyrrolidone to yield a copolymeric amic acid amide solution which when cast at 280°-300° C. yielded an imidized copolymeric film. The following Table V shows the weights and molar concentrations of the reactants as well as the exotherm temperatures.

TABLE V

| Test No. | TMAC Wt. gms. | TMAC Mols | BPA Dianhydride Wt. gms. | BPA Dianhydride Mols | Methylene Dianiline Wt. gms. | Methylene Dianiline Mols | Exotherm Temp. |
|---|---|---|---|---|---|---|---|
| 14A | 1.05 | 0.005 | 2.6 | 0.005 | 1.98 | 0.01 | 41° C. |
| 14B | 1.68 | 0.008 | 1.04 | 0.002 | 1.98 | 0.01 | 49° C. |

Each of the polymers of Examples 12, 13, 14A and 14B were analyzed for Tg's with Table VI giving the results of these analyses. These copolymers can be represented by the formula

XVII.

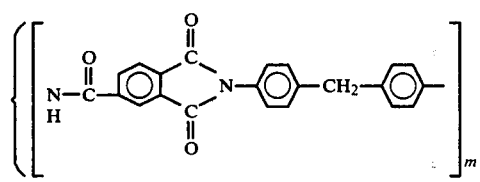

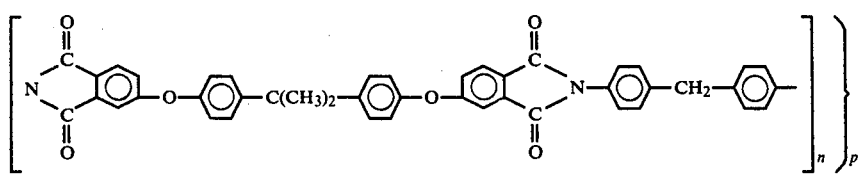

where m, n, and p have the meanings above.

TABLE VI

| Test No. | Tg |
|---|---|
| Ex. 12 | 215° C. |
| Ex. 13 | 187° C. |
| 14A | 220° C. |
| 14B | 229° C. |

It will of course be apparent to those skilled in the art that in addition to the diamino compounds used in making the above copolymers, other diamino compounds, many examples of which have been recited previously, can be used instead. In the same manner, in addition to the bisphenol-A dianhydride employed in the examples in this application, other dianhydrides, many examples of which have been given above, can be employed to make other types of copolymers. Finally, the molar proportions of the reactants can be varied widely to give units of varying molar range previously described without departing from the scope of the invention.

Other polymers and resins can be added to the claimed copolymers in amounts ranging from 1 to 50% or more, by weight, based on the total weight of the copolymer. Among such polymers may be added for instance, polyolefins, polystyrene, polyphenylene oxides, such as shown in U.S. Pat. No. 3,306,875, epoxy resins, polycarbonate resins, such as shown in U.S. Pat. No. 3,028,365, silicone resins, polyarylene polyethers such as shown in U.S. Pat. No. 3,329,909, etc. many of which are well known in the art.

The compositions of the present invention have application in a wide variety of physical shapes and forms, including their use as films, molding compounds, etc. When used as films or when made into molded products, these copolymers, including the laminated products prepared therefrom, not only possess good physical properties at room temperature but they retain their strength and excellent response to workloading at elevated temperatures for long periods of time.

Films formed from the copolymers of this invention may be used in applications where films have been used previously. They serve effectively in an extensive variety of wrapping and packaging applications. Thus, the compositions of the present invention can be used in automobile and aviation applications for decorative and protective purposes, and as high temperature electrical insulation for motor slot liners, in transformers, and as dielectric capacitors.

Alternatively, solutions of the curable compositions herein described can be coated on electrical conductors such as copper, aluminum, etc. and thereafter the coated conductor can be heated at elevated temperatures to remove the solvent and to effect curing (imidization) of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc.

Applications which recommend these resins include their use as binders for asbestos fibers, carbon fibers, and other fibrous materials in making brakelinings. In addition, grinding wheels and other abrasive articles can be made from such resins by incorporating abrasive grains such as alundum, silicon carbide, silicon nitride, carborundum, diamond dust, cubic boron nitride, etc., and shaping or molding the mixture under heat and pressure to obtain the desired configuration and shape for grinding and abrasive purposes.

What we claim as new and desire to secure by Letters Patent of the United States is:

1. A method for making copolymers of etherimide units and amideimide units which comprises simultaneously interacting a mixture of ingredients comprising (I) an organic diamine of the formula:

$$H_2NR^1NH_2$$

(II) An aromatic bis (etheranhydride) of the general formula:

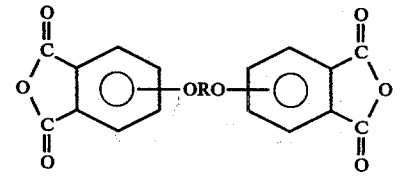

and (III) A trimellitic acid halide of the formula:

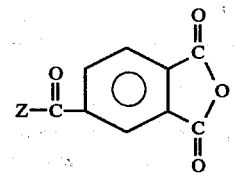

where Z is halogen, R is a member selected from the class consisting of (a) the following divalent organic radicals:

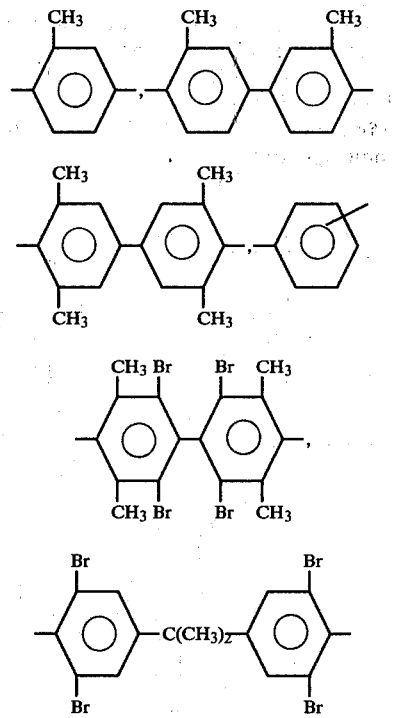

and (b) divalent organic radicals of the general formula:

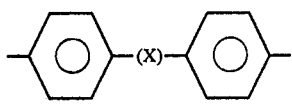

where X is —$C_yH_{2y}$—, y is a whole number equal to from 1 to 5 inclusive, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxanes, and (d) divalent radicals included by the formula,

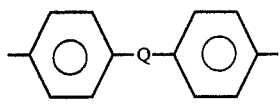

where Q is a member selected from the class consisting of

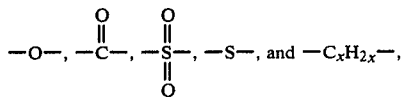

and x is a whole number equal to from 1 to 5, inclusive.

2. The process as in claim 1, wherein the trimellitic anhydride is 4-chloroformyl phthalic anhydride.

3. The process as in claim 1 wherein the trimellitic acid halide and the aromatic bisether dianhydride are employed in a molar ratio of from 0.95 to 1.05 total moles of these two reactants per mole of the organic diamine.

4. The process as in claim 1 wherein the organic diamine is meta-phenylene diamine.

5. The process as in claim 1 wherein the diamine is diphenyl sulfone diamine.

6. The process as in claim 1 wherein the diamine is diaminodiphenyl ether.

7. The process as in claim 1 wherein the diamine is diaminodiphenyl methane.

8. The process as in claim 1 wherein the diamino compound is 2,2-bis(4-aminophenyl) propane.

9. The process as in claim 1 wherein the trimellitic compound is 4-chloroformyl phthalic anhydride and the the dianhydride is 4,4'-bisphenol-A dianhydride.

10. The process as in claim 1 wherein the amine is m-phenylenediamine, the trimellitic acid halide has the formula

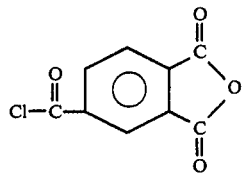

and the dianhydride is 4,4'-bisphenol-A dianhydride.

11. The process as in claim 1 wherein the reactants are interacted at elevated temperatures.

12. A product obtained in accordance with the process of claim 1.

13. A product obtained in accordance with the process of claim 2.

14. A product obtained in accordance with the process of claim 3.

15. A product obtained in accordance with the process of claim 4.

16. A product obtained in accordance with the process of claim 5.

17. A product obtained in accordance with the process of claim 6.

18. A product obtained in accordance with the process of claim 7.

19. A product obtained in accordance with the process of claim 8.

20. A product obtained in accordance with the process of claim 9.

21. A product obtained in accordance with the process of claim 10.

22. A product obtained in accordance with the process of claim 11.

23. A random copolymeric composition selected from the class of general formulas consisting of (a)

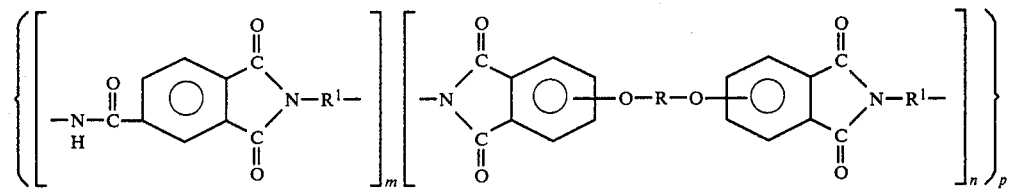

and (b)

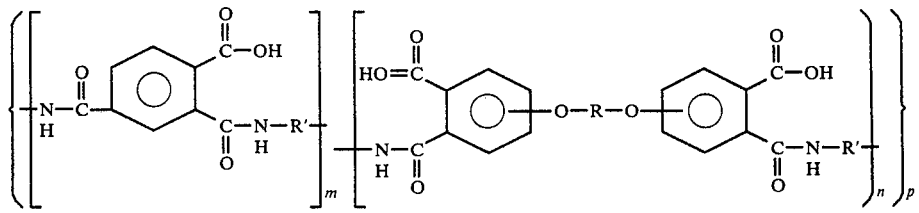

where R is a member selected from the class consisting of (a) the following divalent organic radicals:

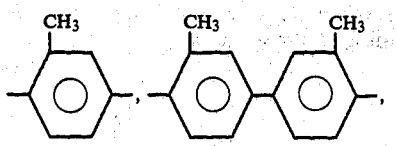

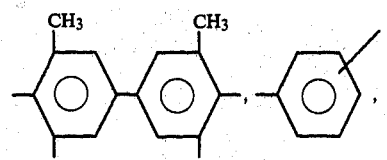

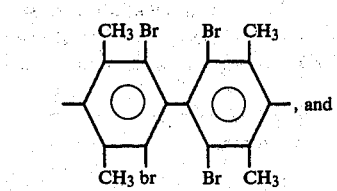

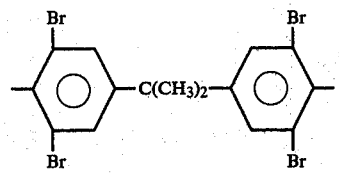

and (b) divalent organic radicals of the general formula:

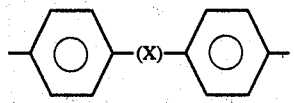

where X is —$C_yH_{2y}$—, y is a whole number equal to from 1 to 5 inclusive, and $R^1$ is a divalent organic radical selected from the class containing of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxanes, and (d) divalent radicals included by the formula, siloxanes, and (d) divalent radicals included by the formula,

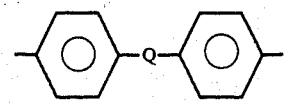

where Q is a member selected from the class consisting of

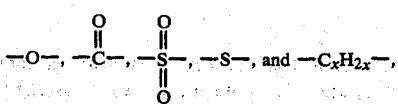

and x is a whole number equal to from 1 to 5 inclusive, m and n are whole numbers independently equal to at least 1, and p is a whole number greater than 1, with the proviso that the reactants used to prepare the random copolymeric compositions are interacted simultaneously.

24. A random copolymer comprising (a) from 5 to 95 mol percent of chemically combined units of the formula

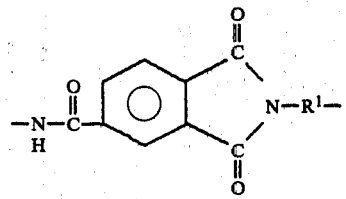

and (b) from 95 to 5 mol percent of chemically combined units of the formula

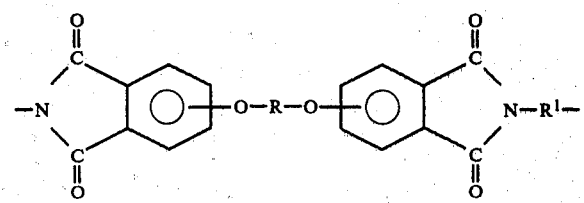

where R is a member selected from the class consisting of (a) the following divalent organic radicals:

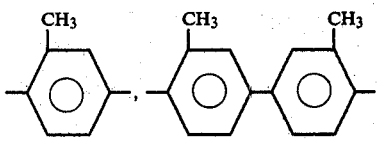

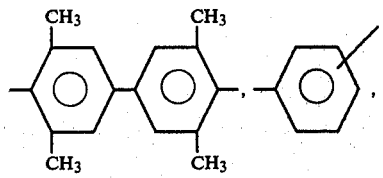

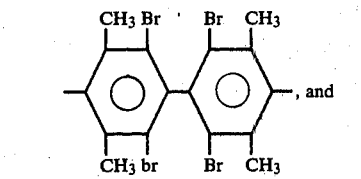

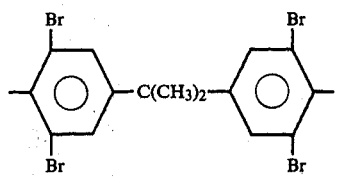

and (b) divalent organic radicals of the general formula:

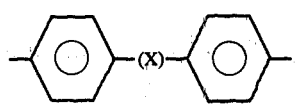

where X is —$C_yH_{2y}$—, y is a whole number equal to from 1 to 5 inclusive, and $R^1$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, (c) $C_{(2-8)}$ alkylene terminated polydiorganosiloxanes, and (d) divalent radicals included by the formula,

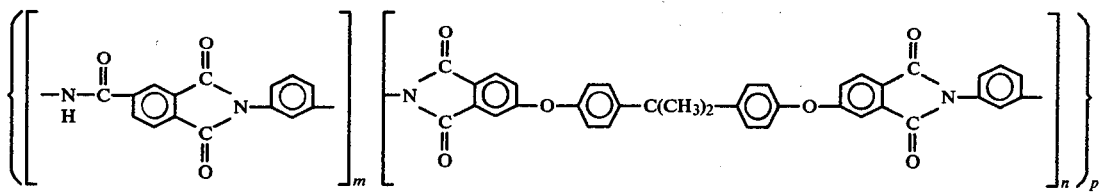

where Q is a member selected from the class consisting of

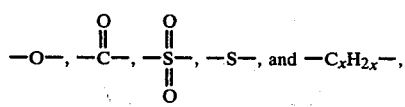

and x is a whole number equal to from 1 to 5, inclusive, with the proviso that the reactants used to prepare the random copolymeric composition are interacted simultaneously.

25. A random copolymeric composition of matter corresponding to the formula

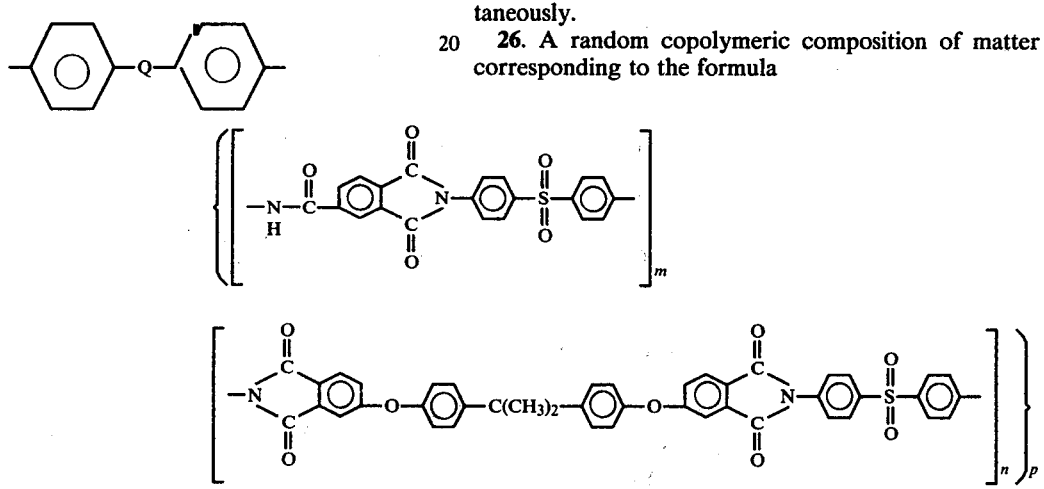

where m and n are whole numbers independently, equal to at least 1, and p is a whole number greater than 1, with the proviso that the reactants used to prepare the random copolymeric composition are interacted simultaneously.

26. A random copolymeric composition of matter corresponding to the formula where m and n are independently whole numbers equal to at least 1, and p is a whole number greater than 1, with the proviso that the reactants used to prepare the random copolymeric composition are interacted simultaneously.

27. A random copolymeric composition of matter corresponding to the formula

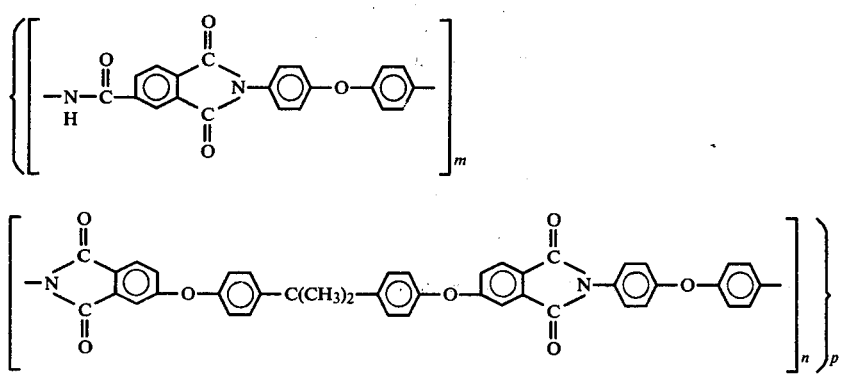

where m and n, independently are whole numbers equal to at least 1, and p is a whole number, greater than 1, with the proviso that the reactants used to prepare the random copolymeric composition are interacted simultaneously.

28. A random copolymeric composition having the formula

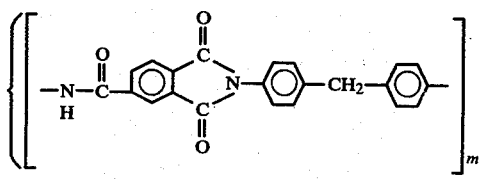

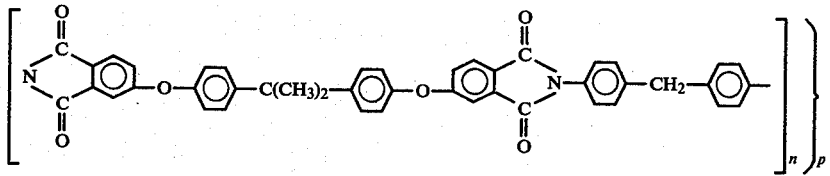

where m and n, independently are whole numbers equal to at least 1, and p is a whole number greater than 1, with the proviso that the reactants used to prepare the random copolymeric composition are interacted simultaneously.

29. A random copolymeric composition having the formula

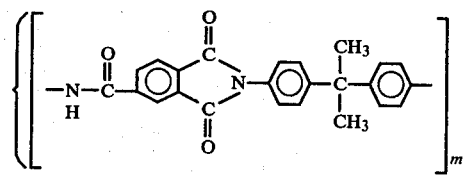

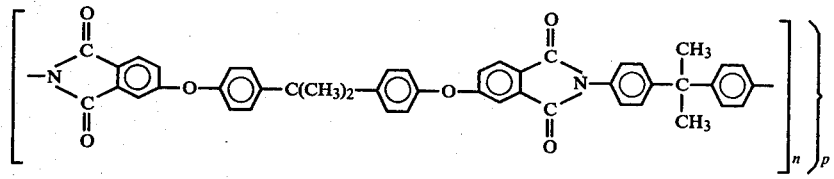

where m and n, independently are whole numbers equal to at least 1, and p is a whole number greater than 1, with the proviso that the reactants used to prepare the random copolymeric composition are interacted simultaneously.

* * * * *